Feb. 7, 1956     B. ROSE ET AL     2,733,645

LIGHTPROOF TANK FOR FILM REELING APPARATUS

Filed April 18, 1952     2 Sheets-Sheet 1

INVENTOR.
BENJAMIN ROSE
BY SAMUEL ROSE

Van Deventer & Shively

ATTORNEYS

Feb. 7, 1956 B. ROSE ET AL 2,733,645
LIGHTPROOF TANK FOR FILM REELING APPARATUS
Filed April 18, 1952 2 Sheets-Sheet 2
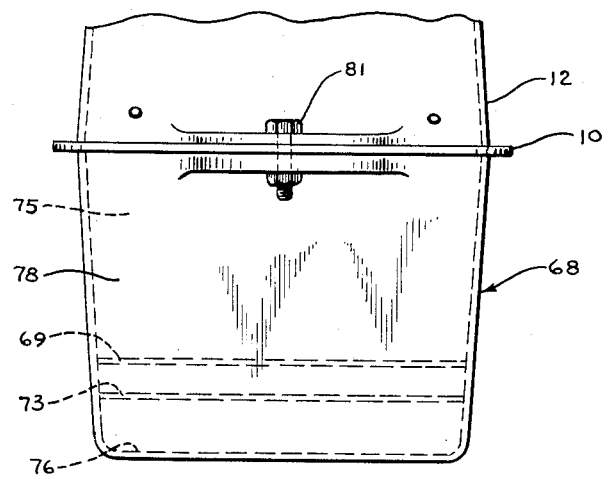
FIG.4
FIG.5
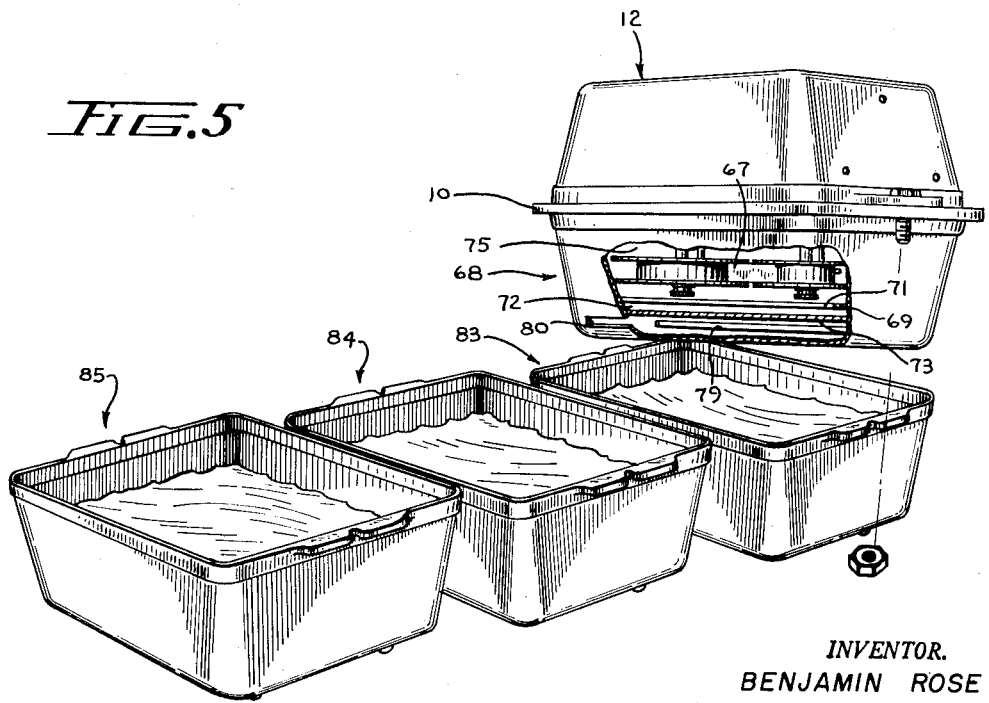
INVENTOR.
BENJAMIN ROSE
BY SAMUEL ROSE
VanDeventer & Shively
ATTORNEYS

United States Patent Office 2,733,645
Patented Feb. 7, 1956

2,733,645

LIGHTPROOF TANK FOR FILM REELING APPARATUS

Benjamin Rose and Samuel Rose, New York, N. Y.

Application April 18, 1952, Serial No. 282,932

1 Claim. (Cl. 95—96)

This invention relates to light-proof tanks for film reeling apparatus, and has for its object the provision of a light-proof tank for film reeling apparatus as disclosed in U. S. Patent 2,595,545 dated May 6, 1952.

In the aforesaid co-pending application is disclosed a film reeling apparatus briefly described by way of illustration in connection with Figure 1 of the instant application which discloses an improved tank for such reeling or other similar apparatus and eliminates the need for a dark room when changing solutions in the apparatus, or where it is desired to move the apparatus containing light-sensitive film from one tank to another to successively subject said film to the action of developing and fixing baths or other solutions without subjecting the film to light and without having to operate slides, valves or other means to permit such solutions to contact the film while in place on the reeling apparatus.

By way of illustration, the invention will be shown as applied to the development of roll films of the ordinary size employed in hand and motion picture cameras, but it will be understood that the disclosure made herein is merely for the sake of illustration and that many changes and modifications can be made in the mode of construction and the form and relationship of the several elements without departing from the spirit and scope of the invention as defined in the appendant claim.

In the accompanying drawings:

Figure 4 is an end view of the tank, Figure 2, looking in the direction of the arrow 4, Figure 1; and Figure 5 is a view showing the film reeling apparatus Figure 1 complete with the improved tank 68, Figures 2 to 4, inclusive, in use to progressively develop, fix and wash film.

Figure 1:
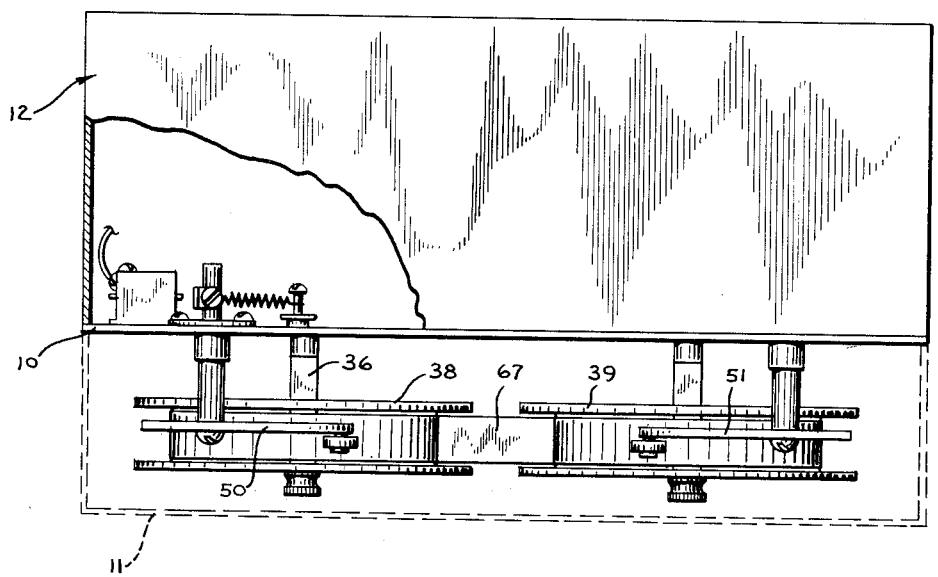
Figure 1 is a view partly in section of a film reeling apparatus as fully disclosed in the aforesaid co-pending application having a tank 11. Modifications in said tank in combination with the reeling apparatus constitute the invention herein described and claimed.

Referring to Figure 1, the numeral 10 denotes a mounting plate upon which the film reeling apparatus per se is mounted. This forms the top of a developer tank 11 shown in dotted lines, and the apparatus is covered by a cover 12.

Within the cover 12 is located a motor, gearing, driving shafts, a clutch and other instrumentalities as more fully described in said co-pending application, whereby when the mechanism is in operation, the reel 38 is driven by shaft 36 and film 67 is wound from reel 39 to reel 38.

When arms 50 and 51 are moved to control the movement and reversal of reels 38, 39, as more fully described in the aforesaid co-pending application, the film is reeled back and forth between reels 38, 39, and is subject to the action of the fluid in tank 11.

A detailed description of the operation of all of the foregoing mechanism will be found in the aforesaid co-pending application.

Now it is obvious that the tank 11 must be imperforate to contain liquid, and, therefore, to change the liquid from developer to fixer, for example—the mechanism must be lifted out of tank 11, the tank washed and the different solution placed therein. This must be done in a dark room, as the film 67 cannot be exposed to light.

Figure 2:
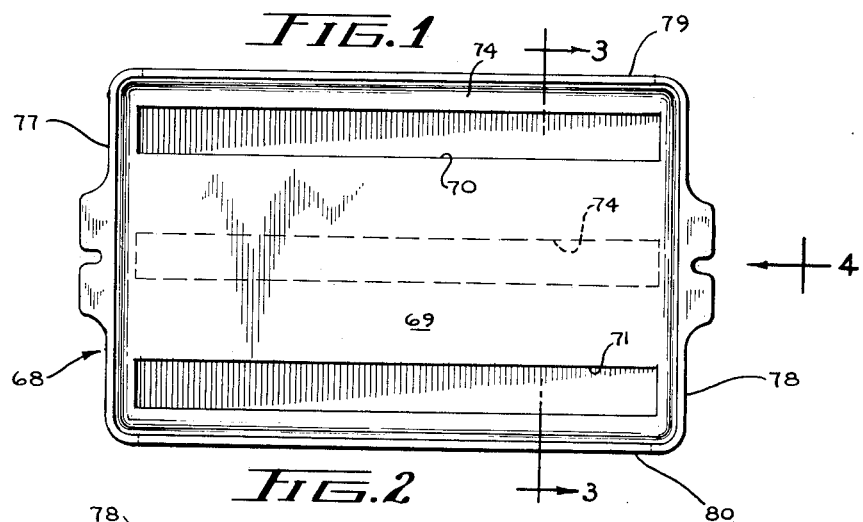
Figure 2 is a view looking into a modified tank 68 to be used in place of tank 11, Figure 1.
Figure 3:
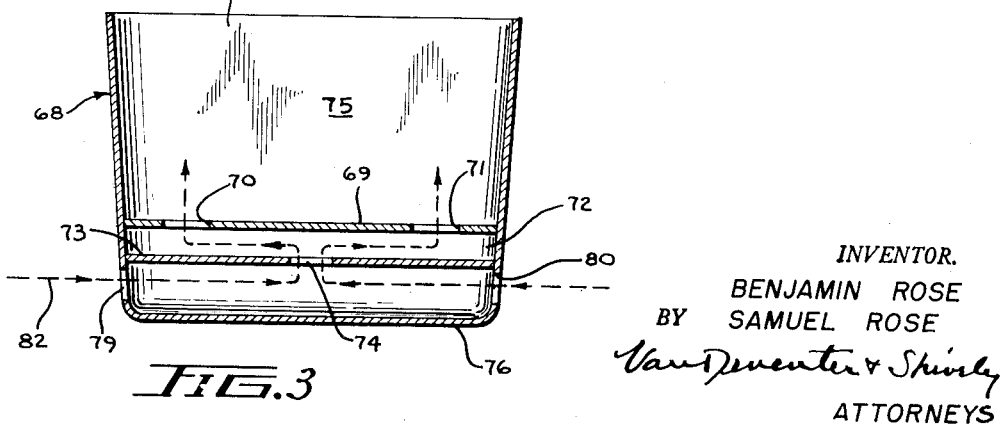
Figure 3 is a sectional view on the line 3—3 of Figure 2.

To eliminate this operation and the use of a dark room, is one of the objects of this invention, and may be accomplished as follows, referring to Figures 2, 3 and 4;

The tank 68, corresponding to tank 11 in Figure 1, is provided with a false bottom 69 having suitable openings 70, 71, therein. The false bottom 69 is cemented or otherwise secured to the end and side walls of the tank 68 and the openings 70, 71, communicate with a chamber 72 formed by the inturned lower portions of said end and side walls, which may be termed the bottom of the tank and said bottom is indicated generally by the numeral 73.

One or more apertures 74 are made in the bottom 73, and may be made at any point or points therein that are not aligned with openings 70, 71, so that no light entering at 74 will be admitted to the interior 75 of the tank.

A baffle plate 76 is supported between the downwardly extending ends 77, 78, of the tank, leaving the openings 79, 80 (or at least one of them) along the sides of the tank for the passage of liquid into the tank via the tortuous path 79, 80, 74, 72, 71, 70, to the interior 75 of the tank. Said path prevents the ingress of light to the interior of the tank but provides a ready path for liquid.

Fasteners—one of which is shown at 81—are provided whereby the tank 68 may be securely attached in light-tight relation to the mounting plate 10 and cover 12 so as to totally enclose the film 67 and all of the mechanism for moving same.

Referring to Figure 5, the complete film feeding apparatus with the improved tank 68 is shown, with the tank cut-away to show the tortuous path for the fluid from the exterior to the interior of the tank, whereby the light is prevented from entering the interior 75 of the tank.

The tortous path for liquid is shown by the dotted line 82. Entering at 79, and 80, along the bottom edge of the tank, the liquid passes into the space between this baffle plate 76 and the bottom 73 of the tank and through the opening on longitudinal slot 74 in the bottom into space 72 below the false bottom 69 and through the longitudinal slots 70, 71, therein to fill the interior 75 of tank 68 sufficiently to submerge the reels 38, 39, and film 67 therein.

Suitable liquids such as developer, fixer, wash water, etc., are placed in trays 83, 84, 85, and the tank 68 is successively immersed in said trays and secured thereto in operative relationship by any suitable means. As the tank 68 is light-tight as previously described, the film 69 is not in danger of being light-struck as the tank 68 is moved from one tray to another, and may finally be set to drain.

When the developing and fixing operations are completed, the tank 68 is removed from the reeling unit, and the film unloaded in light, in the usual manner.

The reeling mechanism and its light-tight tank 68 in combination with a plurality of trays 83, 84, 85—or any desired number—constitute a complete film-treating unit which renders a dark room unnecessary when performing these operations.

What is claimed is:

Film treating apparatus comprising in combination a tank, a plate adapted to fit on top of the tank and form a light-tight cover therefor, means for supporting film to be processed carried by said cover plate at the underside thereof disposed within the tank in spaced relation with the walls thereof when said cover plate is in place on the tank, said tank having an imperforate bottom wall, and side walls of the tank being provided in the lower part thereof above the bottom wall with openings providing passages for liquid, said tank having means in the lower part thereof providing a light-tight path for the entrance of liquid and preventing the entrance of light along said path, said means comprising vertically spaced horizontal partitions in the tank above said openings in side walls of the tank, said partitions having openings therein each facing a solid part of one of the partitions, said cover plate with the film supporting means carried thereby being bodily movable as a unit in place on the tank and removable therefrom while said means forming the light-tight path for liquid, remains within the tank, and a tray adapted to hold liquid and receive said tank whereby the tank may be immersed in liqquid in the tray while light is prevented from reaching film on said film supporting means.

References Cited in the file of this patent

UNITED STATES PATENTS

| | | |
|---|---|---|
| 1,140,500 | Corey | May 25, 1915 |
| 1,602,931 | Pope | Oct. 12, 1926 |
| 1,750,704 | Caute | Mar. 18, 1930 |
| 2,212,357 | Vanderwalker | Aug. 20, 1940 |
| 2,242,600 | Reyniers | May 20, 1941 |
| 2,325,120 | Forse | July 27, 1943 |
| 2,368,079 | Stiffler | Jan. 23, 1945 |
| 2,371,771 | Morse | Mar. 20, 1945 |
| 2,405,160 | Morse | Aug. 6, 1946 |